United States Patent [19]

Webb et al.

[11] Patent Number: 5,413,709

[45] Date of Patent: May 9, 1995

[54] SOLID/LIQUID SEPARATION APPARATUS WITH ADJUSTABLE SCREEN

[75] Inventors: Robert M. Webb, Agoura; Thomas M. Webb, Newbury Park, both of Calif.

[73] Assignee: T. H. Creears Corporation, Westlake Village, Calif.

[21] Appl. No.: 275,302

[22] Filed: Jul. 14, 1994

Related U.S. Application Data

[63] Continuation of Ser. No. 912,546, Jul. 13, 1992, Pat. No. 5,330,643, which is a continuation-in-part of Ser. No. 706,888, May 29, 1991, abandoned.

[51] Int. Cl.6 ............................................. B01D 35/00
[52] U.S. Cl. .................................... 210/255; 210/335; 210/455; 209/273; 209/353
[58] Field of Search ............... 209/273, 353, 354, 405; 210/159, 162, 232, 255, 335, 407, 409, 455, 456, 483, 499

[56] References Cited

U.S. PATENT DOCUMENTS

| | | | |
|---|---|---|---|
| 571,776 | 11/1896 | Long | 210/409 |
| 3,363,769 | 1/1968 | Wilmot et al. | 210/251 |
| 3,452,876 | 7/1969 | Ginaven | 210/409 |
| 4,097,382 | 6/1978 | Cruea | 210/456 |
| 4,113,626 | 9/1978 | Detcher | 210/409 |
| 4,268,382 | 5/1981 | Hanke et al. | 200/273 |
| 4,274,952 | 6/1981 | Hanke et al. | 209/273 |
| 4,297,213 | 10/1981 | Airey et al. | 210/255 |
| 4,512,880 | 4/1985 | Connolly | 209/273 |
| 4,670,136 | 6/1987 | Schmidt et al. | 209/405 |
| 4,671,877 | 6/1987 | Godbeer | 210/409 |
| 4,981,587 | 1/1991 | Moorhead | 210/402 |
| 4,990,249 | 2/1991 | Leuenberger | 210/167 |
| 5,330,643 | 7/1994 | Webb et al. | 210/255 |
| 5,354,467 | 10/1994 | Moorhead | 209/273 |

*Primary Examiner*—Robert A. Dawson
*Assistant Examiner*—Robert James Popovics
*Attorney, Agent, or Firm*—Brown, Martin, Haller & McClain

[57] ABSTRACT

A solid/liquid separation apparatus in which a downwardly-inclined separator screen is supported across the open front face of a liquid collection chamber. The screen and chamber are mounted in an outer frame having spaced side walls. The screen has separate upper and lower sections and is adjustably mounted on at least one of the side walls at a position intermediate the upper and lower ends of the screen so that it can be moved inwardly and outwardly in a direction transverse to the plane of the screen to adjust the relative vertical angles of screen sections. In one version, the upper and lower screen sections are separate screens and are adjustable via separate adjustment mechanisms.

6 Claims, 2 Drawing Sheets

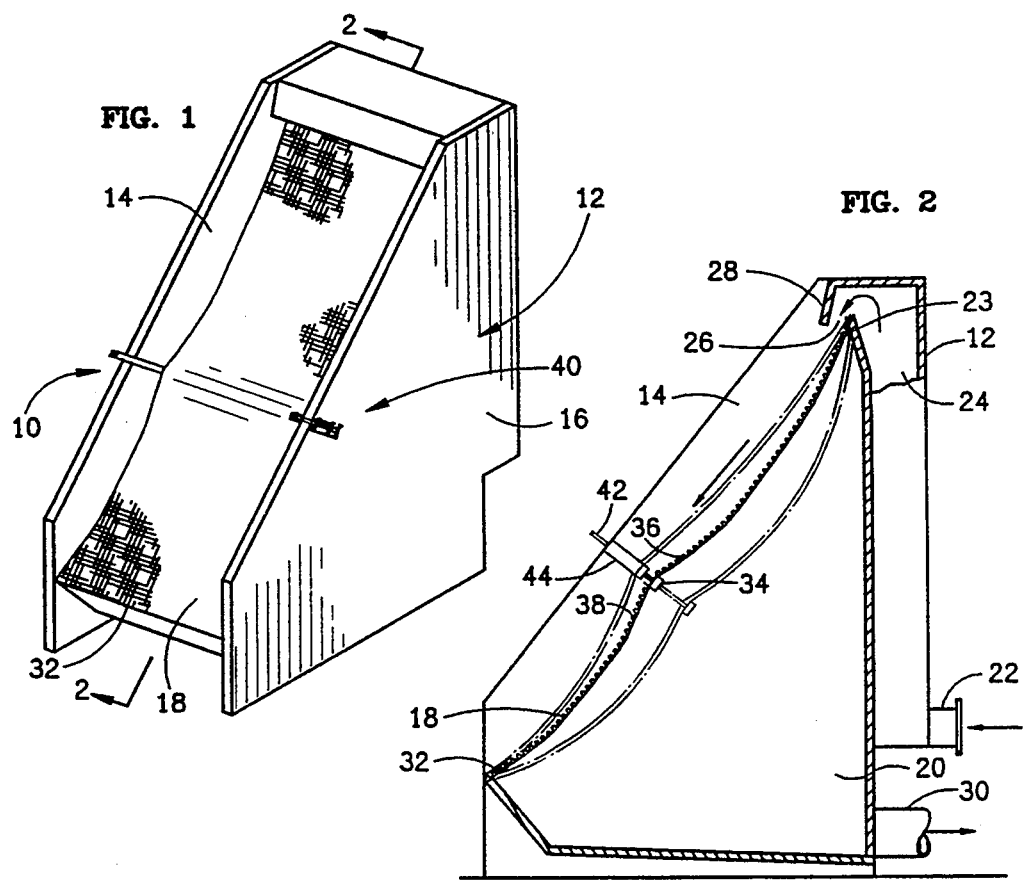
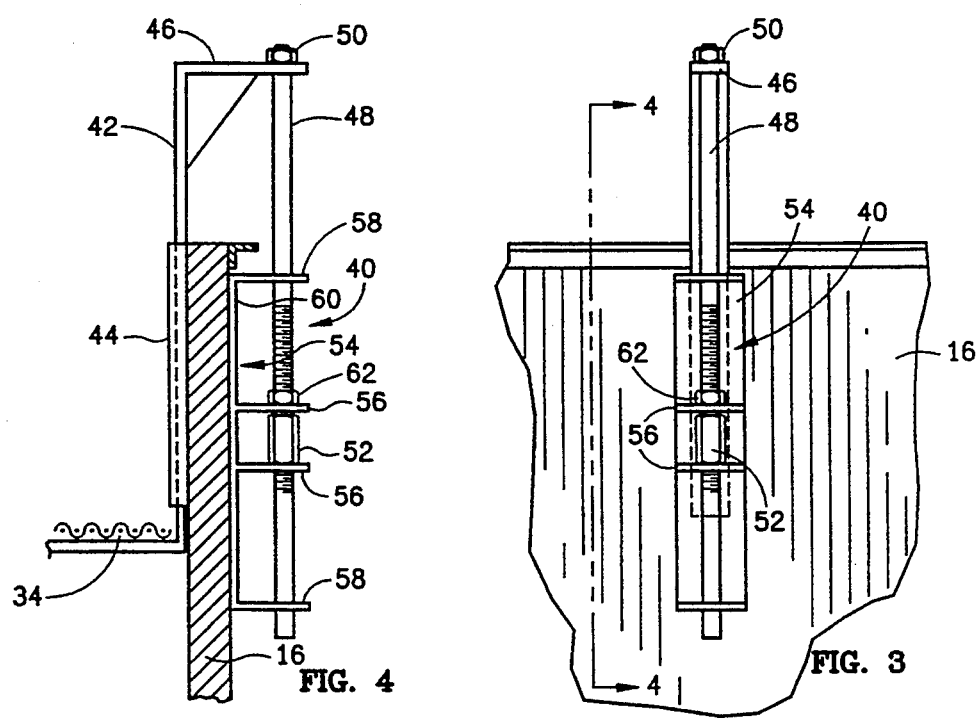

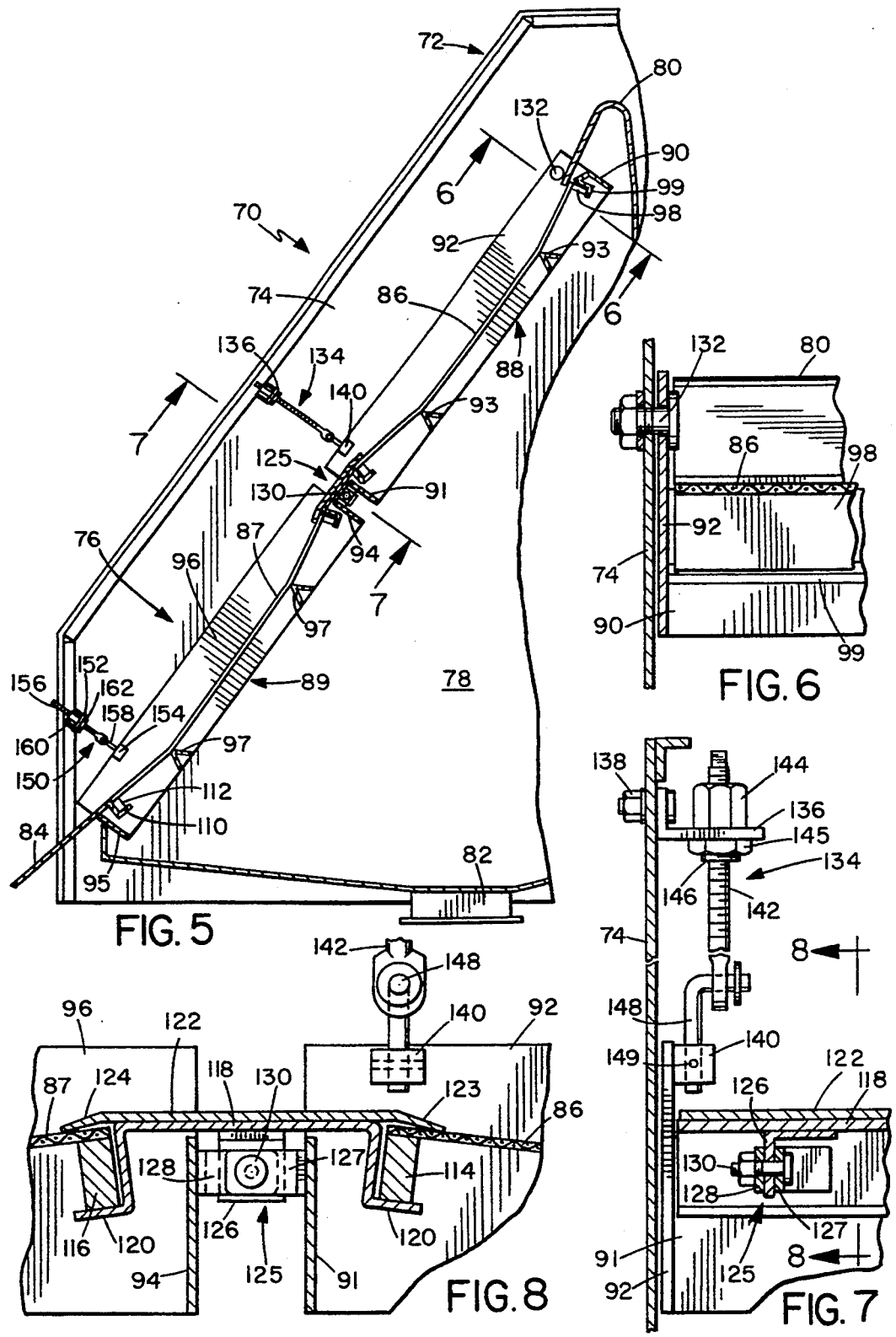

SOLID/LIQUID SEPARATION APPARATUS WITH ADJUSTABLE SCREEN

CROSS-REFERENCES TO RELATED APPLICATIONS

This application is a continuation of application Ser. No. 07/912,546, filed Jul. 13, 1992, now U.S. Pat. No. 5,330,643; which in turn is a continuation-in-part of application Ser. No. 07/706,888, filed May 29, 1991, now abandoned.

BACKGROUND OF THE INVENTION

The present invention relates generally to apparatus for separating solids from a solid/liquid mixture, and is particularly concerned with separating apparatus for removing solids from a flowing slurry or sludge.

Screen assemblies are commonly used in separating solid/liquid mixtures in sewage plants, the paper-making industry, and other processing industries. In U.S. Pat. No. 3,452,876 of Ginaven, for example, de-watering equipment is described in which a downwardly inclined screen is supported in a frame. Slurry is supplied to the top end of the screen, and flows down the screen towards its lower end. As the slurry travels down the screen, liquid falls down through the screen openings into a drain chamber behind the screen. The de-watered slurry slides over the end of the screen into a suitable receptacle or onto a conveyer for further treatment. In this apparatus, different types of slurries having different water content are accommodated by different length screens, with sections of the screen being made longer for slurries which are harder to drain. Thus, a completely different screen unit is typically needed for each type of material to be separated.

SUMMARY OF THE INVENTION

It is an object of this invention to provide a new and improved screen assembly for a solid/liquid separation apparatus.

According to the present invention, a solid/liquid separation apparatus is provided, which comprises an outer support frame having opposite side walls, a downwardly inclined filter screen supported between the side walls, an inlet for directing a solid/liquid mixture to be separated onto the screen at the upper end of the screen so that the mixture flows along the screen towards its lower end, a support member extending transversely across the screen at an intermediate point in its length to divide the screen into separate upper and lower sections, and an adjustment mechanism for moving the support member and attached region of the screen inwardly and outwardly in a direction transverse to the screen to adjust the relative angles of inclination of the upper and lower sections of the screen.

In this way, the screen can be adjusted quickly and easily to accommodate different types of materials. Generally, by moving the support member outwardly, the upper section of the screen is inclined less steeply while the lower section is made more steep. The material flows faster down the screen when it is made steeper, and the sudden change in angle at the support causes the solids to roll over the screen, shearing liquid away from the solids. The screen can be adjusted on site to achieve the optimum screen orientation for a particular material to be treated.

The screen may be divided into more than two relatively adjustable sections, if desired, to provide a greater degree of adjustability, by providing additional support members and associated adjustment devices.

In one embodiment of the invention, the upper and lower sections of the screen comprise two separate screens mounted in separate upper and lower frames, the upper frame being pivotally mounted on the support frame at its upper end, and the lower frame being pivotally secured to the support frame at its lower end. The frames are pivotally linked together at their adjacent ends. Preferably, the upper screen has a larger screen opening size than the lower screen. Preferably, a first adjustment mechanism is provided adjacent the lower end of the upper screen for adjustably securing the upper frame to the support frame so that the frame can be moved inwardly and outwardly for angle adjustment. A similar adjustment member is provided at the lower end of the lower screen.

This provides a smooth and reliable adjustment over the desired angular range.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which:

FIG. 1 is a perspective view of a solid/liquid separation apparatus according to a first embodiment of the invention;

FIG. 2 is a vertical cross section on the lines 2—2 of FIG. 1;

FIG. 3 is a side elevational view of the adjustment mechanism of the apparatus of FIG. 1;

FIG. 4 is a section on the lines 4—4 of FIG. 3;

FIG. 5 is a vertical cross-section of a separation apparatus according to a second embodiment of the invention;

FIG. 6 is a section on the lines 6—6 of FIG. 5;

FIG. 7 is a section on the lines 7—7 of FIG. 5; and

FIG. 8 is a section on the lines 8—8 of FIG. 7.

DESCRIPTION OF THE PREFERRED EMBODIMENTS

FIGS. 1–4 of the drawings illustrate a solid/liquid separation apparatus 10 for removing solids from a flowing slurry or sludge according to a first embodiment of the present invention. The apparatus basically comprises an outer support frame or housing 12 having spaced side walls 14, 16, and an inclined filter or separator screen 18 supported between the side walls to cover the open front face of a liquid collection chamber 20 within the housing 12.

An inlet 22 for material or slurry to be separated is provided at the rear of housing 12, and an inlet passageway 24 extends from inlet 22 to the upper end 23 of screen 18. A narrow outlet 26 at the top of passageway 24 is formed by downwardly depending lip or plate 28, which ensures that the slurry spreads in a sheet-like manner over the upper surface of the screen 18, as indicated by the arrows in FIG. 2. An outlet 30 for separated liquids is provided at the lower end of chamber 20, as illustrated in FIG. 2. Material flowing from the lower end 32 of screen 18 will be collected in a suitable container or conveyor for further processing.

The screen may comprise any wedge-wire screen of the type used in de-watering equipment. In a preferred embodiment, the screen was a Sprout-Bauer Hydrosieve screen as manufactured by Sprout-Bauer, Inc. of Muncy, Penna.

Preferably, screen 18 is suitably secured at its upper end 23 to the top end of chamber 20, and is secured at its lower end 32 to the lower end of the chamber, with some free play between its ends so it is not stretched tight across the chamber. A support member or beam 34 extends across the width of the screen at a point between its upper and lower ends to separate the screen into upper and lower sections 36, 38 and to support the screen at the transition between sections 36 and 38. The beam 34 is adjustably mounted at each end on the respective side walls 14, 16 via an adjustment mechanism 40, as illustrated in more detail in FIGS. 3 and 4, to allow the relative angles between the sections 36 and 38 to be adjusted, as explained in more detail below. Standard wedge-wire screens such as the Sprout-Bauer Hydrosieve have sufficient flexibility to allow this adjustment to be made.

As illustrated in FIGS. 3 and 4, the beam or rod 34 extending across the screen has a perpendicular, L-shaped extension 42 at each end projecting upwardly from each side of the screen and slidably located in guide sleeve 44 mounted on the inner face of the respective side wall 14, 16. Adjustment mechanism 40 is mounted on the outer face of each side wall opposite the guide sleeve and is connected to the free end 46 of the respective extension 42 to control movement of the extension up and down through guide sleeve 44.

Each adjustment mechanism 40 comprises an adjustment screw 48 having a head 50 at one end secured to the free end 46 of extension 42 and projecting downwardly into threaded engagement with an adjustment nut 52 on guide bracket 54. Bracket 54 is mounted on the outer side of the respective side wall 14, 16 opposite guide sleeve 44. Guide bracket 54 has a pair of central flanges 56 and a pair of outer guide or stabilizing flanges 58 all projecting outwardly from rear wall 60 and having aligned openings through which the screw 48 projects. Adjustment nut 52 is located between the center two guide flanges 56, and lock nut 62 is threadably engaged on the screw 48 on the opposite side of one of the center flanges 56 to adjustment nut 52.

Thus, rotation of the adjustment nut 52 in opposite directions will move the screw 48 up and down through bracket 54, simultaneously moving support rod 34 upwardly or downwardly to change the relative angles of inclination of the upper and lower screen sections 36 and 38, for example as indicated in dotted outline in FIG. 2. The arrangement is such that the screen is always pitched out at the support rod. Preferably, the adjustment mechanism is arranged to provide a 1 degree change in screen angle for each inch of adjustment, and has a maximum adjustment of four or five inches for a screen which is 52 inches long. An equivalent adjustment is made at each end of the support rod on each side of the screen. A scale may be provided on the shaft of screw 48 to indicate the relative screen angles at each screw adjustment position. The adjustment may be made manually, or a suitable drive mechanism may be provided for powering the adjustment.

In this way, a wide range of adjustment for different types of solid-liquid slurries is provided, with the angle of the upper and lower screen sections to the vertical being adjustable, and the relative angle between adjacent sections also being adjustable from a relatively sharp change in angle to a relatively small angle change. The speed at which the solids roll down the screen is dependent on the screen angle, with the speed increasing as the screen section approaches the vertical. Thus slower or faster speeds can be selected as necessary. The sudden angle change between adjacent sections has the effect of shearing more liquid from the solids rolling down the screen. The screen can be adjusted on site to provide the optimum screen orientation for the type of material being treated, and locked in the adjusted position via the lock nuts 62. The screen pore or opening size may also be varied between the top and bottom sections, for example from 60 thousandths at the top section to 40 thousandths at the bottom.

FIGS. 5-8 illustrate a solid/liquid separation apparatus 70 according to a second embodiment of the invention. As in the first embodiment, the apparatus basically comprises an outer support frame or housing 72 having spaced side walls 74, and an inclined screen assembly 76 supported to extend at an angle between the upper and lower ends of housing 72 and covering the open front face of a liquids collection chamber 78 in the housing.

Material or slurry to be separated enters an inlet (not illustrated) at the rear of the housing and flows onto the upper end of the screen assembly over weir plate 80. An outlet 82 for separated liquids is provided at the bottom of chamber 78. Solids flowing down to the lower end of the screen assembly will flow out over a solids discharge plate 84 which spans the lower end of the screen, and will be collected in a suitable container or conveyor for further processing.

As best illustrated in FIG. 5, the screen assembly in this embodiment is formed as two separate upper and lower screen sections 86, 87. Each screen section 86, 87 is supported in an open rectangular cradle 88, 89, respectively. Upper cradle 88 has spaced upper and lower end plates 90, 91 and spaced side walls 92 defining an open rectangular frame, and spaced cross braces or bars 93 extend between the side walls across the open bottom of the cradle. Similarly, the lower cradle 89 has spaced upper and lower end plates 94, 95 and side walls 96, and spaced cross braces 97 extending between the side walls.

The upper screen section 86 is supported at its upper end 98 on a support bracket 99 formed on the upper end plate 90 of the upper cradle, and extends across the cross braces 93 to the lower end of the cradle. The solids discharge plate 84 extends over the lower end plate 95 of lower cradle 89 and has an L-shaped support lip 110 for supporting the lower end 112 of lower screen section 87. The screen section 87 extends across the lower cradle 89 over the cross braces 97 to the upper end of the cradle.

As best illustrated in FIG. 8, the lower end 114 of the upper screen and the upper end 116 of the lower screen are secured together via a center screen support member 118 which comprises an elongate plate extending across the width of the screen assembly and spanning the gap between the screens at the center of the assembly. The plate has down-turned L-shaped rims 120 along its opposite side edges on which the respective screen ends 114, 116 are secured. A central solids transition plate 122 extends over the support member 118 and respective screen ends, the plate 122 having inclined or bevelled upper and lower guide surfaces 123, 124 to form a smooth, continuous guide surface for materials sliding from the upper screen to the lower screen.

As illustrated in FIG. 8, it can be seen that the transition plate 122 has a different angle from both the preceding screen section 86 and the successive screen 87.

In addition to forming a transition between successive screen sections, plate 122 will also change the velocity of the material flowing over it and will enhance the de-watering operation.

The upper and lower cradles are pivoted together at their respective lower and upper ends via pivot assembly 125 which is best illustrated in FIGS. 7 and 8. Preferably, two identical pivot assemblies 125 are provided, one adjacent each side of the screen assembly. One of the pivot assemblies 125 is illustrated in FIGS. 7 and 8. Each pivot assembly 125 basically comprises a center support pivot bracket 126 extending downwardly from central support member 118 and sandwiched between upper and lower cradle pivot brackets 127, 128, respectively, which extend inwardly into the gap between the cradles from the lower end plate of the upper cradle and the upper end plate of the lower cradle. The respective pivot brackets are pivotally secured together by pivot pin 130, which extends through aligned openings in the brackets as illustrated in FIG. 7.

The upper end of the upper cradle is pivotally secured to the housing via pivot pins 132 which pivotally connect the respective opposite side walls of the cradle to the adjacent side wall 74 of the housing, as illustrated in FIGS. 5 and 6. Only one of the pivot pins is visible in the drawings, but it will be understood that the pivot mounting on the opposite side wall will be identical.

The lower end of the upper cradle is adjustably secured to the housing via a first angle adjustment mechanism 134, as best illustrated in FIGS. 5 and 7. FIGS. 5 and 7 illustrate an adjustment mechanism which adjustably secures one side wall 92 of the upper cradle to the adjacent side wall 74 of the housing. It will be understood that an identical adjustment mechanism will be provided to connect the opposite side wall to a location on the opposite side of the housing.

As best illustrated in FIG. 7, the adjustment mechanism 134 includes a first mounting bracket 136 secured via lock nut 138 to the side wall 74 of the housing so as to project transversely inwardly above the side wall of the cradle, and a second mounting bracket 140 projecting transversely inwardly from the upper end of the cradle side wall in alignment with the first bracket 136. A screw-threaded adjustment shaft 142 projects downwardly through first mounting bracket 136. An adjustment nut 144 is threaded onto shaft 142 on the upper side of bracket 136, and a lock nut 145 is threaded onto the threaded end of nut 146 on the lower side of the bracket. An L-shaped angle adjustment pin 148 is pivotally secured to the second mounting bracket 140 at one end via pin 149 and projects through an opening at the lower end of adjustment shaft 142 to provide a pivotal connection to shaft 142. With this mechanism, the angle of the upper screen can be adjusted by rotating adjusting nuts 144 on each side of the housing after loosening the respective lock nuts 145. This moves shaft 142 up and down, and moves the attached side walls of the cradle up and down by an equivalent distance to make the angle of the upper screen section more shallow or steeper.

A similar adjustment mechanism 150 is provided at opposite sides of the lower end of lower cradle 89. Each lower adjustment mechanism 150 is of identical construction to the upper cradle adjustment mechanism 134, and comprises first and second mounting brackets 152, 154 projecting inwardly from the housing and lower cradle side walls, respectively, and an adjustment shaft 156 projecting downwardly through mounting bracket 152. A linking pin 158 connects the lower end of shaft 156 to the cradle side wall bracket 154, and pin 158 is pivotally secured to bracket 154 in an equivalent manner to pin 148. An adjustment nut 160 is threaded on shaft 156 on the upper side of bracket 152, and a lock nut 162 is threaded on the projecting threaded end of nut 160 on the lower side of bracket 152. Thus, the angle of the lower screen section can be adjusted independently of the upper screen section, simply by releasing the lock nuts 162 on opposite sides of the lower end of the screen, and then rotating adjustment nuts 160 by equivalent amounts so as to move the shaft 156 up and down, and move the lower end of the cradle up and down by an equivalent amount, with the cradle pivoting about pivot pin 130 at its upper end to change the angle of the lower screen section.

Preferably, the adjustment mechanisms for the upper and lower screen sections are designed to provide an angular adjustment range from 50° to 60° to the horizontal in the upper screen section, and at least 50° to 55° to the horizontal in the lower screen section. With this embodiment, unlike the first embodiment, the upper and lower screen sections can each be adjusted independently. When the lower screen is adjusted, the lower screen pivots about pivot pin 130. Similarly, when the upper screen is adjusted, it will pivot about upper pivot pins 132.

The upper and lower screen material is preferably of the wedge-wire type as in the first embodiment, and the upper screen preferably has a larger screen opening size than the lower screen. For example, the upper screen vertical opening size may be around 0.060 inches, while the lower screen vertical opening size is around 0.040 inches.

The screen housing and cradles are of suitable rigid materials such as stainless steel. As illustrated in FIG. 5, each screen section includes at least three relatively angled sections divided by the cross braces 93 and 97. The successive changes in slope will cause changes in the velocity of movement of the slurry across the screen, enhancing separation.

The screen assembly of FIGS. 5–8 provides for easy and independent adjustment of the top and bottom screen angles so that the overall screen can be adjusted quickly, easily and accurately to the optimum relative angles from the upper to the lower screen, depending on the type of material to be separated.

Although some preferred embodiments of the invention have been described above by way of example only, it will be understood by those skilled in the field that modifications may be made to the disclosed embodiments without departing from the scope of the invention, which is defined by the appended claims.

We claim:

1. A solid/liquid separation apparatus, comprising:
   an outer support frame having spaced side walls;
   a liquid collection chamber between the side walls having an open front face;
   a downwardly-inclined separator screen assembly supported over the open front face of the liquid collection chamber, the assembly having an upper end and a lower end, and the assembly including at least two successive screen sections;
   an inlet passageway at the upper end of said screen assembly for directing the solid/liquid mixture onto the upper end of said screen assembly;
   the successive screen sections comprising a first screen section having a first angle of inclination and a second screen section having a second angle of inclination, the two successive screen sections having a junction between the two screen sections;

first adjustment means for adjusting the first angle of inclination of the first screen section;

second adjustment means for adjusting the second angle of inclination of the second screen section; and a transition plate extending across the junction between the first and second screen sections for guiding material from the first screen section to the second screen section.

2. The apparatus as claimed in claim 1, wherein the two screen sections comprise separate first and second screens each having an upper end and a lower end, said junction comprising hinge means connecting said screen sections together at their adjacent lower and upper ends, and said transition plate extending from the lower end of the first screen to the upper end of said second screen across said hinge means.

3. The apparatus as claimed in claim 1, wherein the transition plate has an upper bevelled guide surface for guiding material from the first screen section onto the plate, a lower bevelled guide surface for guiding material from the plate onto the second screen section, and a central portion extending between said upper and lower bevelled guide surfaces.

4. The apparatus as claimed in claim 3, wherein said upper bevelled guide surface has an angle of inclination different from the angle of inclination of said first screen section and said lower bevelled guide surface has an angle of inclination different from the angle of inclination of said second screen section.

5. The apparatus as claimed in claim 1, wherein said transition plate has a third angle of inclination different from said first and second angles of inclination.

6. The apparatus as claimed in claim 1, wherein said transition plate is a solid metal plate.

* * * * *